March 5, 1946.  J. W. BAYMILLER ET AL  2,395,837
GOLF CLUB AND METHOD OF MANUFACTURING THE SAME
Filed May 14, 1941  3 Sheets-Sheet 1
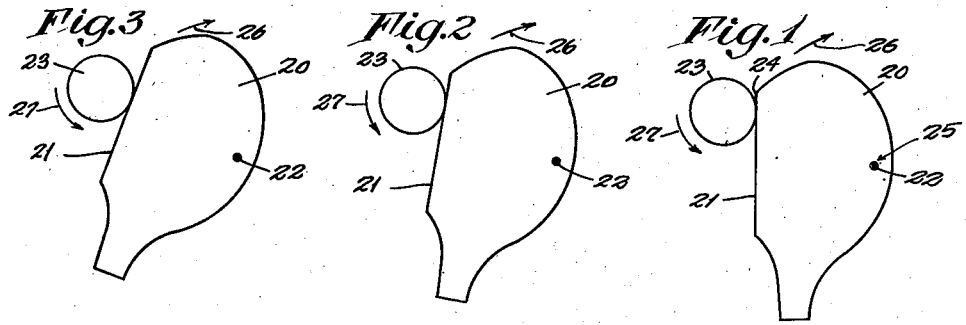
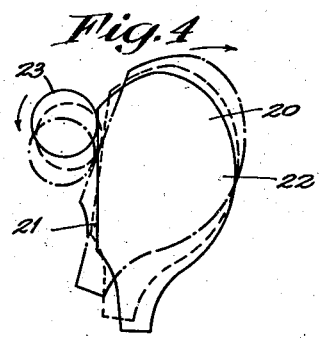
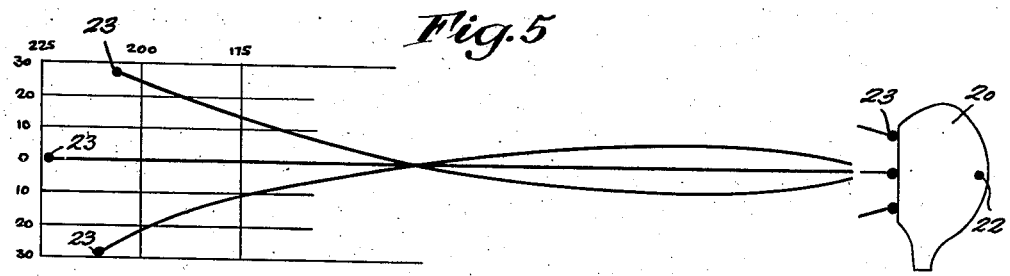
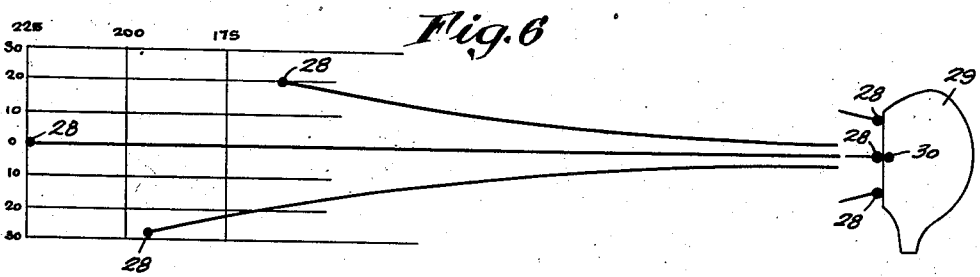
INVENTORS
John W. Baymiller
BY Robert W. Vose
ATTORNEYS March 5, 1946.     J. W. BAYMILLER ET AL     2,395,837
GOLF CLUB AND METHOD OF MANUFACTURING THE SAME
Filed May 14, 1941     3 Sheets-Sheet 2
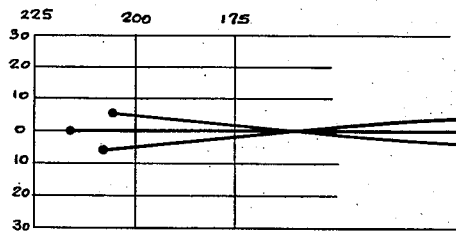
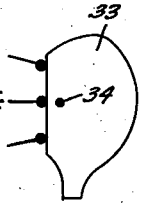
Fig. 7
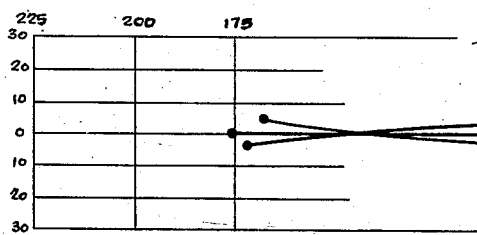
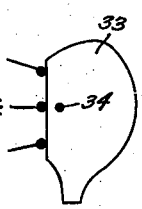
Fig. 8
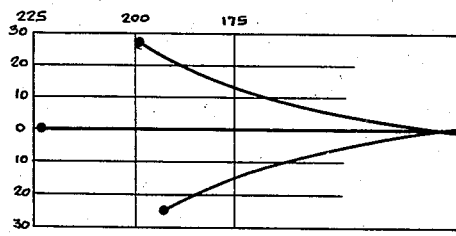
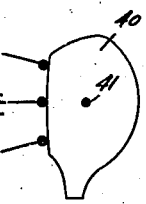
Fig. 9
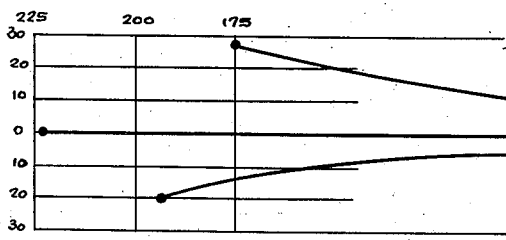
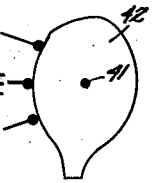
Fig. 10
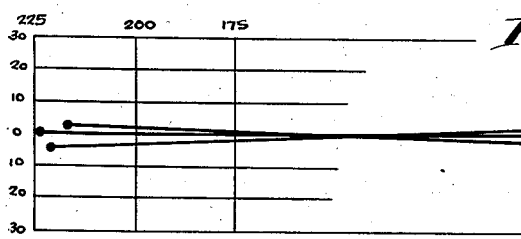
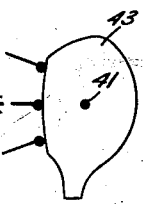
Fig. 11
INVENTORS
John W. Baymiller
BY Robert W. Vose
Toyrer and Mack
ATTORNEYS March 5, 1946.  J. W. BAYMILLER ET AL  2,395,837
GOLF CLUB AND METHOD OF MANUFACTURING THE SAME
Filed May 14, 1941  3 Sheets-Sheet 3
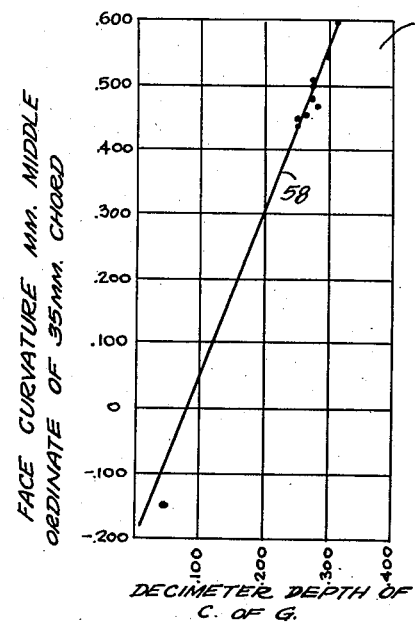
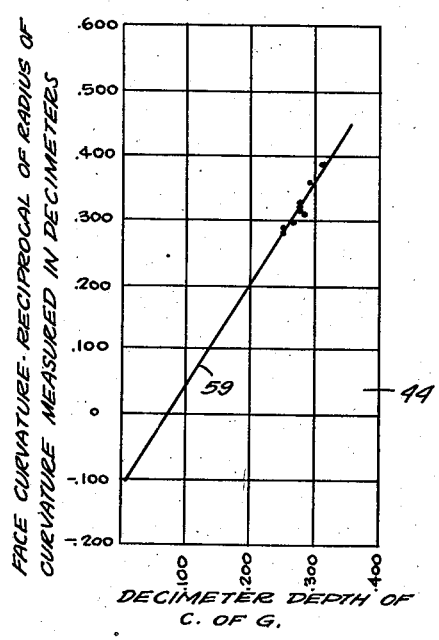
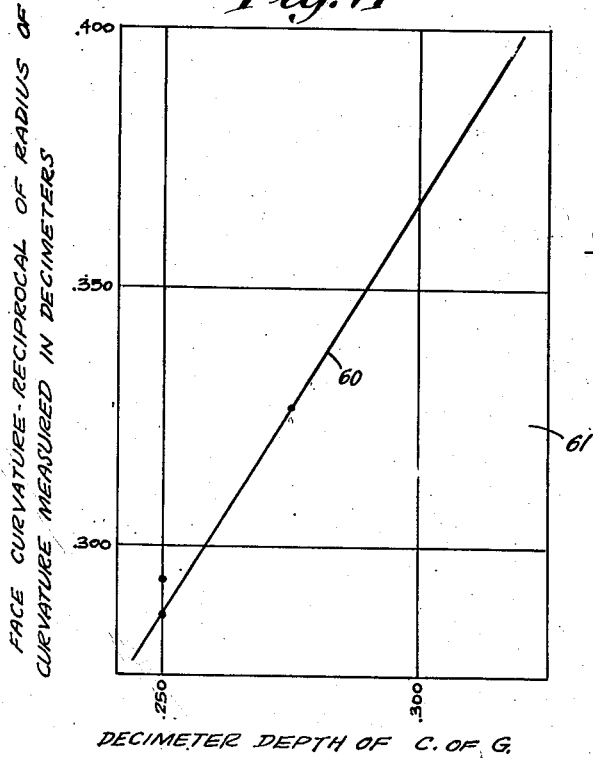
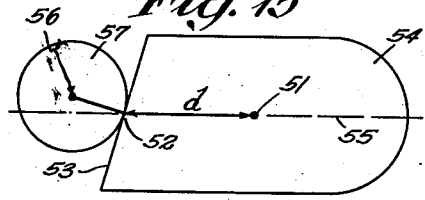
INVENTORS
John W. Baymiller
BY Robert W. Vose
Joyner and Mack
ATTORNEYS Patented Mar. 5, 1946

2,395,837

UNITED STATES PATENT OFFICE 2,395,837

GOLF CLUB AND METHOD OF MANUFACTURING THE SAME

John W. Baymiller and Robert W. Vose, West Springfield, Mass., assignors, by direct and mesne assignments, to A. G. Spalding & Bros. Inc., Chicopee, Mass., a corporation of Delaware Application May 14, 1941, Serial No. 393,318

1 Claim. (Cl. 273—77)

This invention relates to golf clubs and to methods of manufacture of golf clubs. It relates particularly to means for obtaining substantially zero dispersion in a golf club, so that no adverse flight dispersion will result from hitting a golf ball with the toe or heel of the club face. It relates to making the face curvature correct when the position of the center of gravity has been located in a club head of a desired shape and model. It also relates to the positioning of the center of gravity of the club head when the curvature for the golf club face has been formed.

Heretofore, there have been many and divers designs for the face of a golf club. Flat faces, convex faces and concave faces have each been stylish in their day. Although the "bulge" face has been considered one of the best looking for wooden clubs in recent years, there has been no great consistency among the manufacturers regarding the amount of bulge to be used.

Many of the most recent wooden clubs of various manufacturers were recently tested and it was found that in all of the drivers the center of gravity was positioned at substantially the same point, but that the face curvature varied from an extreme amount to a perfectly flat face. Moreover, some faces were flat at the heel and round at the toe, and many faces were humped with more curvature at the toe than at the heel. Some clubs had more curvature at the bottom of the face than at the top.

When very recently introduced sets of clubs were tested, it was found that certain sets used the identical curvature for each club notwithstanding the fact that the center of gravity of a No. 2 wood is not the same as that for a No. 4 wood. Moreover, it has been found, by testing a number of clubs of each of several manufacturers, that manufacturers have generally neglected to maintain any uniformity or similarity of the curvature of the face of the club, even on clubs supposed to be identical. Apparently, the curvature of the bulge has generally been left to the whim of the individual golf club craftsman. This has been particularly true in the manufacture of wooden clubs as distinguished from the irons which are usually flat.

It has been found that the use of the above-described clubs results in hooks and slices whenever the ball is hit by the toe or heel of the club face. Players using conventional clubs tend to try to compensate for their previously poor shots, and in doing so operate in a vicious circle producing even worse results than should theoretically result from such conventional clubs and/or the player's imperfect skill. Moreover, such adverse hooks and slices or adverse curved dispersion of flight of the golf balls produces a low average distance for the shots (viz., if a ball ended thirty yards to the side of the line desired, there could be a loss of thirty yards and could be a loss of one or two strokes bringing it back into the line).

There have been some attempts to eliminate the adverse dispersion causative factors. However, none have been completely or practically effective. Heretofore, there has been no appreciation that adverse dispersion due to off-center shots could be eliminated solely by means of positioning of the center of gravity and/or accurately and meticulously curving the face relative to the center of gravity.

Norman Stewart Main, in U. S. Patent 1,901,562, describes a trial-and-error method of developing a suitable curvature for a golf club face to supplement the correction which he achieves by maximizing the moment of inertia.

It is an important object of the present invention to provide a method of scientifically manufacturing golf clubs having substantially zero dispersion.

Another important object is to provide a method of manufacturing golf clubs having an ability to send a ball the maximum average distance.

An important feature of the present invention is the provision of a scientific method of determining the correct face curvature of a golf club having a predetermined center of gravity, or alternatively determining the correct position for the center of gravity of a club head having a predetermined face curvature, or concurrently establishing the correct relationship between them.

Another important feature of the present invention is the provision of a graph or chart showing the correct relationship between the location of the center of rotation of a golf club head and the curvature necessary for obtaining substantially zero dispersion.

Another feature of the present invention is the provision of a golf club having a minimized dispersion.

Still another feature of the present invention is the provision of a method of manufacturing a golf club adapted to hit balls the maximum average distance.

In the drawings:

Figure 1 shows a top view of a wooden golf club head at the moment of touching a ball.

Figs. 2, 3 and 4 show diagrammatically the rotation of a club head about the center of gravity.

Figs. 5, 6, 7, 8, 9, 10 and 11 show trajectories of golf balls.

Fig. 12 shows a chart showing the correlation between the location of the center of gravity and the middle ordinate of the curvature.

Fig. 13 shows a chart showing the correlation between the location of the center of gravity and the reciprocal of the radius of curvature, as does Fig. 14.

Fig. 15 shows a diagrammatic representation of the center of gravity in the club head.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the figures, it will be seen that in Figs. 1–4 there is shown a golf club head 20 having a flat face 21 and rearwardly positioned center of gravity 22. The flat-faced style of golf club was popular during one period in the history of the game, and is still popular with some players.

Heretofore, when a ball has been hit by the heel or toe portion of a conventional improperly faced club an adverse hook or slice has resulted because of the incorrect club face. Although some adverse hooks and slices are due to the player's technique in failing to squarely hit the ball, many are attributable essentially to the incorrect curves on the faces of the clubs. In the development of the present invention it was discovered that the real reason for this phenomena is two-fold: when a golf ball 23 is hit by an off-center portion of the club head 20, as for example by a toe portion 24, as shown in Fig. 1, the club head 20 rotates about an instantaneous center 25 substantially coinciding with the center of gravity 22. A large number of multiflash photographs were made of golf club action and the analysis of them established that during the contact of ball and club, approximately .0006 second, the club head functioned as an independent projectile and rotated about the center of gravity 22 as the instantaneous center 25. The club face 21 is thereby shifted so that a toe shot initially sends the golf ball 23 to the right, as shown in Fig. 5. It should be particularly noted that as the club head 20 rotates clockwise about the center of gravity 22 as indicated by arrows 26 and as shown in Figs. 2, 3 and 4, the club face 21 imparts to the ball 23 a counterclockwise side spin about a vertical axis, indicated by arrows 27 about the ball 23. Vector analysis of the movement of a point near the toe of the club head shows that the major component is sidewisedly in a direction away from the normal position of the center of the face, and that there is also a minor component in a backward direction. Because the club head is moving forward, and in contact with the ball, the backward component is substantially ineffective in imparting spin, and all transmission of moment-of-inertia forces is believed to be substantially related to the sidewise component. Thus, it is easy to see why the ball 23 is given a counter-clockwise spin about a vertical axis. After the ball 23 has left the club head 20, the frictional reaction between the counterclockwise sidespinning golf ball 23 and the air causes the ball 23 to turn toward the left. As seen in Fig. 5, the ball 23 lands substantially thirty yards to the left of the center line. The reaction between the air and the side-spinning golf ball is known as the Magnus effect.

Presuming, in an effort to better understand and describe the present invention, observations and resultant theory involving the kinetic energy of the driven ball, the time, the distance from the toe to the center of gravity, and the moment of inertia of the golf ball for a certain shot, it was possible to approximately calculate for a given shot the revolutions per minute of the golf ball. The calculated value of 900 revolutions per minute was reasonably well confirmed by photographic analysis of the speed of revolution about a vertical axis, which gave a value of approximately 1,000 revolutions per minute. Because the ball 23 has such a high forward velocity during the first portion of the trajectory, and because it has surface markings, the air flows turbulently with respect to the ball. However, it is believed that after the ball has lost sufficient velocity the condition of laminar flow or viscous flow (as distinguished from turbulent flow) is established, and the rotation of the ball is most effective in altering its line of travel. It is believed that the Magnus effect is most pronounced after the velocity of the ball is reduced sufficiently to establish viscous flow of the air relative to the ball.

As shown schematically in Fig. 5, the Magnus effect causes the ball 23 to go to the left of the center line of flight when struck by the club head 20 having a rearwardly positioned center of gravity 22, or, as pointed out hereinafter in connection with Fig. 9, when struck by a club having insufficient curvature. With clubs having less than optimum-face curvature the sidewise spin has been so great as to produce overcompensation for the initial veering of the ball. Because the air resistance factor is of considerable importance in connection with said Magnus effect, the dimples and/or other surface markings of the golf ball affect the degree of hook or slice resulting from a shot. However, substantially all of the reasonably expensive golf balls have surface markings which are substantially equivalent in this respect, and only those balls having a perfectly smooth outer surface would have a reaction substantially different from that described for the golf balls used in development of the present invention.

In Fig. 6 there are shown the experimentally determined trajectories of golf balls 28 struck by a golf club head 29 with a straight face. It should be noted that a center of gravity 30 of the club head 29 is extremely forward. It is apparent that as the club head 29 rotates about the center of gravity 30 the movement of a point near the toe provides a vector analysis component in a backward direction which cannot impart a spin as explained hereinabove. There is also a sidewise component of the movement of a point near the toe as the club head 29 rotates about the center of gravity. Because the sidewise component is in the direction toward the normal position of the center of the face, the transference of the moment-of-inertia forces causes the ball to spin clockwisedly about a vertical axis. The clockwise side spin imparted by the rotation of the club head 29 produces a Magnus effect resulting in a tendency to slice. Thus, the Magnus effect is additive, instead of corrective, to the slice causative factor incident to the club head 29 initially sending the ball to the right, as shown in Fig. 6. This is particularly true of iron clubs where the center of gravity is close to the face. The spin can be said to be undercompensation for the initial veering of the ball. A contrast of the trajectories shown in Figs. 5 and 6 shows that the spin of the ball and relative action of a ball and club head are all very much dependent upon the position of the center of gravity with respect to the curvature or lack of curvature of the face. So far as is known, the above-described experiments had not been performed and/or appreciated prior to the development of the present invention.

A golf club head 33 with a straight face having the center of gravity 34 positioned substantially seven to eight millimeters from the face, as represented in Fig. 7, produces substantially no dispersion of shots. A golf ball struck by the club head 33, whether struck by the toe, heel or sweet-spot portion, will end its flight substantially in the zone of zero dispersion. The sidewise spin imparted to the ball by the club head 33 is substantially compensatory for the initial veering of the ball and/or other dispersion causative factors, and this is true whether the ball is struck a short or a long distance, as diagrammatically illustrated in Figs. 7 and 8.

Not only flat-faced clubs but also bulged clubs have center-of-gravity locations that result in overcompensation, undercompensation and correct compensation, as described in connection with the flat-faced club heads 20, 29 and 33. For example, a club head 40 in Fig. 9, having a predetermined center-of-gravity location 41, and insufficient curvature, was found by numerous tests to produce adverse hooks and slices from the toe and heel portions, respectively, as shown in Fig. 9. A club head 42 in Fig. 10 having the same center-of-gravity location 41 as club head 40, but having excess curvature, was found to produce adverse hooks and slices from the heel and toe portions, respectively, as shown in Fig. 10. The trajectories indicated by Figs. 9 and 10 were obtained by stationing a number of observers at a plurality of positions along the flight of the ball and by plotting the numerous and detailed observations.

By the same method, there were plotted trajectories of balls struck by a club head 43 shown in Fig. 11 having the same center-of-gravity location 41 as the club heads 40 and 42 but having a correctly compensating curvature. Clubs substantially similar to the club head 43 are of particular importance because they are substantially similar to conventional wooden clubs as regards the position of the center of gravity, and differ therefrom in the provision of a face curvature accurately formed with respect to the center of gravity. In Figs. 12 and 13 are graphically shown the properties of a number of club heads such as the club head 43.

The loft of the club face was found to have substantially no influence on the relationship between the curvature and the location of the center of gravity within the range of lofts covered by the distance clubs, Nos. 1, 2, 3 and 4 woods and No. 2 irons.

By means of such charts as above described, and by graphical calculations, it was possible to determine relationship existing between the location of the center of gravity and the radius of curvature of a club adapted to hit balls within the zone of substantially zero dispersion. As used in this specification, the zone of zero dispersion means substantially the area extending approximately five yards on each side of the straight line representing the perfectly straight shot of approximately 225 yards. The driving machine used in the development of the present invention normally shot balls approximately 225 yards. A club regularly sending toe, heel and sweet-spot shots into the zone of zero dispersion, that is, within approximately five yards of the central line of flight, may sometimes herein be designated as a zero-dispersion club.

In Fig. 13 there is shown a graph 44 illustrating the relationship, calculated as above described, between the location of the center of gravity and the reciprocal of the radius of curvature for zero-dispersion clubs. In actual practice, the middle ordinate has been found to be a more convenient value than the reciprocal of the radius of curvature measured. A measuring instrument, including two rigid legs exactly 35 mm. apart, may be placed against the object being tested, and the micrometer reading of an adjustable middle leg may then be taken. In Fig. 12 a graph 45 shows the relationship between center-of-gravity location and face curvature as measured in middle ordinate values. That the middle ordinate values are not unduly arbitrary is indicated by the close similarity between graphs 44 and 45.

A preferred embodiment of the present invention is a set of distance clubs having the following characteristics:

|  | Middle ordinate | Radius | Reciprocal | C. of g. depth in dm. |
| --- | --- | --- | --- | --- |
|  | Mm. | Dm. |  |  |
| #1 wood | 0.60 | 2.54 | 0.393 | 0.315 |
| #2 wood | .55 | 2.79 | .358 | .295 |
| #3 wood | .50 | 3.05 | .328 | .275 |
| #4 wood | .45 | 3.41 | .294 | .250 |
| #2 iron | −.15 | −15.31 | −.065 | .030 |

As referred to in this specification, and as schematically represented in Fig. 15, the position of a center of gravity 51 is always considered in respect to the shortest distance from the center of gravity 51 to a striking point 52 on a face 53 of a club head 54. The center of gravity 51 defines a horizontal plane 55 which also includes the striking point 52. In normal play it frequently happens that a center 56 of a golf ball 57 is not in the plane 55. The ball 57 is preferably but not necessarily positioned to contact the striking point 52.

Although the graph 45 shows only a line or, in graphical terminology, a curve 58, connecting the reference points, it should be understood that a club having characteristics represented by a point substantially close to, but not exactly on, the curve 58 has been found to be a substantially zero-dispersion club, as outlined above, and accordingly in referring to the characteristics of a club representing a single point on the curve, any point exactly on or substantially close to the curve is deemed to be included. The same is true regarding a curve 59 of the graph 44 and a curve 60 in a graph 61 in Fig. 14.

The explanations made herein regarding toe shots are by analogy applicable to heel shots as established by photographic and graphical analysis.

The method of manufacturing golf clubs according to the present invention includes the steps of forming a golf club head, measuring the center-of-gravity location and/or the radius of curvature of the bulge of the face, and modifying at least one of said properties so that they substantially correspond to a single point on the curve of the graph 45 shown in Fig. 12. Preferably the golf club head is formed according to the general shape and model desired, its center of gravity determined, and then the face is modified to provide a curvature such that the curvature and center of gravity are related substantially as indicated by a single point on the curve 58 of graph 45. The curvature may be cut and shaped from an originally oversize face or may be built up by adding a face plate or the like thereon. The center-of-gravity position may be altered by adding and/or positioning weights or by other suitable means.

Golf club heads are provided with shafts, grips, etc., to complete the manufacture of golf clubs in accordance with the present invention.

Enlargements of those portions of graphs 44 and 45 covering center-of-gravity depths within the range of conventional wooden clubs have been found especially satisfactory in the practice of the present invention.

Variations and modifications may be made within the scope of this invention and portions of the improvements may be used without others.

Having thus described the invention what is claimed as new is:

In the process of manufacturing golf clubs having a striking face provided with a curvature extending along a line from toe to heel thereof and bearing a definite relation to the distance of the center of gravity of the club from the face, the steps of determining the center of gravity of the club and measuring the shortest distance in a horizontal plane from the center of gravity to the striking face, calculating the radius of curvature of the face in accordance with the formula $$d = .074 + \frac{1}{1.63R}$$

wherein $R$ is the radius of curvature of the face and $d$ is the shortest distance in a horizontal plane from the center of gravity to the striking face, and forming the curve of the striking face with the calculated radius of curvature.

JOHN W. BAYMILLER.
ROBERT W. VOSE.